March 31, 1964  H. J. MILLER ET AL  3,127,207
QUICK RELEASE FASTENING APPARATUS
Original Filed July 30, 1959
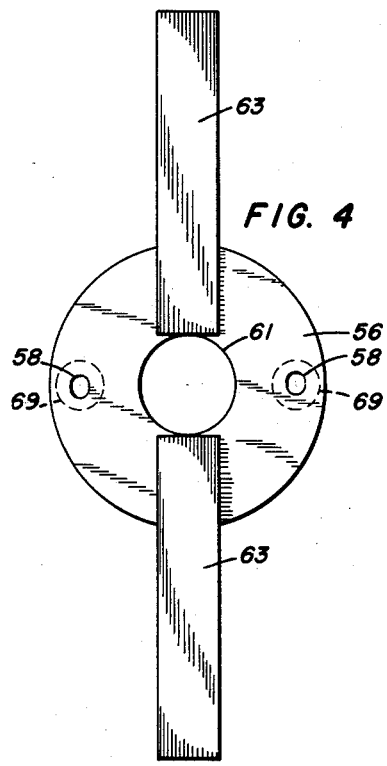
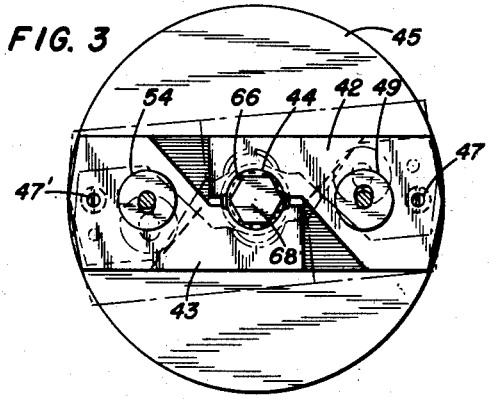
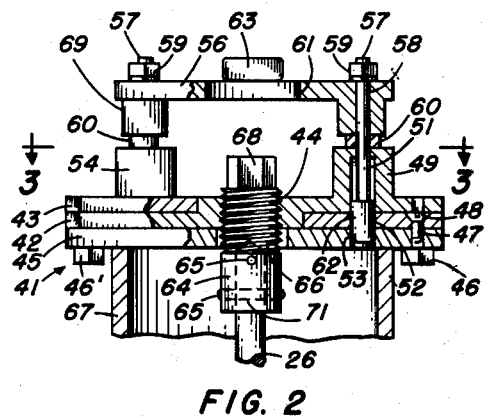
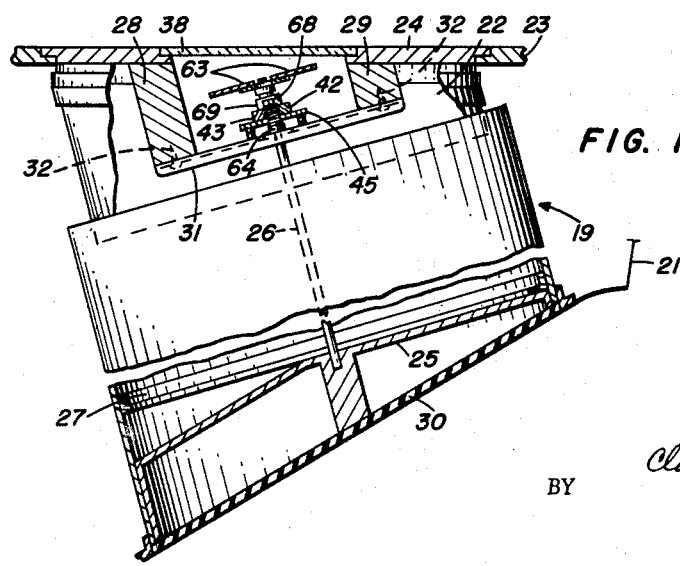
INVENTORS
HERBERT J. MILLER
MICHAEL M. BEHLES
JAMES B. CLARK
BY Claude Funkhouser
ATTORNEY
Cornelius J. Husar
AGENT United States Patent Office 3,127,207
Patented Mar. 31, 1964

3,127,207
QUICK RELEASE FASTENING APPARATUS
Herbert J. Miller and Michael M. Behles, Baltimore, and James B. Clark, Lutherville, Md., assignors, by mesne assignments, to the United States of America as represented by the Secretary of the Navy
Original application July 30, 1959, Ser. No. 830,688, now Patent No. 3,054,633, dated Sept. 18, 1962. Divided and this application June 27, 1962, Ser. No. 205,807
2 Claims. (Cl. 292—300)

This application is a division of application Serial No. 830,688, filed July 30, 1959, for Quick Release Fastening Apparatus and which matured into U.S. Patent No. 3,054,633 on September 18, 1962.

This invention relates to quick release fastening apparatus and more particularly to a fastening apparatus having a plurality of members adapted to mate together to form an opening for receiving and securely holding the end of a rod, or the like, that is to be releasably held.

There are numerous known fastening devices that can be easily disconnected but do not provide a rigid attachment, or if a rigid attachment is effected, then the fastener cannot be readily disconnected. Thus, the known fastening devices do not adequately provide for a quick disconnect and a rigid attachment in the same structure.

In the present invention, the fastening apparatus has a plurality of members which are mated together to form an opening for receiving and holding the end of a connecting rod, or the like, that is to be releasably held. There are additional means which are adapted to maintain the members in mating position when the connecting rod is being held or is adapted to release the members from mating position and from engagement with the connecting rod thereby allowing the rod to fall free of the fastener. The connecting rod is under a constant tension load that tends to pull the rod out of engagement with the fastener unless the two mating members are in mating position to securely hold the rod. Therefore, an axially split fastener is provided that affords a rigid attachment which can be quickly disconnected without sacrificing the efficiency of the rigid attachment as in known constructions.

An object of the present invention is the provision of a clamping device which provides a secure attachment while still being adapted to be quickly disconnected in case of an emergency.

A further object of the invention is the provision of a device which is simple in construction, has a minimum number of parts and costs very little to produce.

Yet another object of the present invention is a split fastener holding a rod under a constant tension which will assist in releasing the rod from the split fastener when the fastener is allowed to separate.

Other objects and many of the attendant advantages of this invention will be readily appreciated as the same becomes better understood by reference to the following detailed description when considered in connection with the accompanying drawings wherein:

FIG. 1 shows a side elevation, partly in section, of an embodiment of the present invention which illustrates how the device is mounted in an escape chute of a seaplane;

FIG. 2 illustrates a side elevation, partly in section, of the embodiment shown in FIG. 1;

FIG. 3 shows a section of the fastener device taken on the line 3—3 of FIG. 2; and FIG. 4 is a plan view of the handle shown in FIG. 2.

Referring now to the drawings, wherein like reference characters designate like or corresponding parts throughout the several views, there is shown in FIG. 1 a personnel escape chute 19 mounted in a seaplane hull 21. The upper end of the escape chute 19 is in alignment with and extends into an opening 22 in the floor 23 of the seaplane. An upper hatch or door 24 closes the opening 22 when the personnel chute is not in use. The lower end of the escape chute is closed by a lower hatch or door 25 having a pressure and water seal 30 connected thereto and conforming to the outline of the hull 21 of the seaplane or any like vehicle. A connecting rod 26 is secured at its lower end to the lower hatch 25 and extends upwardly through the escape chute 19. The lower hatch or door 25 is prevented from being pulled up into the chute 19 by means of an annular flange 27 which abuts the upper edge of lower door 25. Flange 27 is fixedly secured to the inner surface of the chute 19 by welding or some other suitable securing means. Secured to the underside of the upper hatch 24 are two downwardly extending struts 28 and 29, made of a suitable material such as wood or metal, connected together by a metal plate 31 with screws 32 or any other equivalent means. Mounted on the plate 31 is a split screw-threaded fastener, generally indicated as 33, which engages the upper screw-threaded end of the rod 26. It can be readily seen that due to the weight of the lower hatch or door 25 as well as preloading of rod 26 and/or pressure asserted on door 25, a constant tension load is placed on the rod 26. This tension load assists in operating the split screw-threaded fastener 33.

In the event of an emergency, the operation of the assembly of FIG. 1 to hatch 25 to provide an emergency escape passage for personnel is as follows: the auxiliary door 38 is opened and the handle 63 is first pulled out permitting rotation of the handle 63. By this movement of the handle 63, the mating members 42 and 43 are moved out of engagement with the threaded end of the rod 26. When the rod 26 is released it falls downwardly due to the load thereon caused by the weight of the lower hatch 25. The upper end of the escape chute 19 is cleared by lifting the upper hatch 24 upwardly carrying therewith the struts 28 and 29, the plate 31 and the mating members 42 and 43.

Referring to FIG. 2, there is shown the fastener generally indicated as 41, having a pair of mating split plates 42 and 43, each of the plates, 42 and 43, is generally Z-shaped in cross-section and substantially U-shaped in plan view, each of the members mate together to form a screw-threaded opening 44. As best seen in FIG. 3 one-half or 180° of the opening 44 is formed by the U-shaped plate member 42 while the other 180° of the opening is formed by the U-shaped split plate member 43. Split plate member 43 is pivotally connected at one end to a cover 45 by any suitable means, such as the nut 46 and bolt 47 which passes through an aperture 48 in plate 43. The aperture 48 is countersunk to allow the head of bolt 47 to be flush with the under surface of plate 43. Split plate member 42 is similarly connected to the diametrically opposite part of the cover 45 by a bolt 47' and a nut 46'. On the end of plate 42 that is remote from bolt 47', a boss 49 is provided having an opening 51 therethrough which is directly in line with openings 52 and 53 in plate 43 and cover 45, respectively. Split plate 43 has a similar boss 54 on the end thereof remote from bolt 47. Although not sectioned, boss 54 has an opening similar to opening 51 of boss 49 which is in line with openings in plate 42 and cover 45 similar to openings 52 and 53.

A circular plate 56, as shown in FIG. 4, has a handle 63 connected thereto and a central hole 61 therein. Handles 63 are secured to the plate 56 by welding or any other suitable means. Extending downwardly from plate 56 are a pair of oppositely disposed lugs 69. Plate 56 is provided with a pair of openings 58 which extend through plate 56 and lugs 69, as can more clearly be seen in FIG. 2. A pair of pins 57 having their upper ends threaded are securely mounted in the openings 58 of plate 56 by means of upper nuts and lower nuts, 59 and 60, respectively. The lower end of 62 of each pin 57 is enlarged and is movable through openings 51, 52 and 53. It can readily be seen that when pins 57 are in their lower position split plate member 42 is locked to cover plate 45 and split plate member 43 is likewise secured to the cover plate 45.

The upper end of connecting rod 26 is received in a bore 71 of a connecting member 64, and is fixedly secured thereto as by pins 65. Connecting member 64 is provided with external threads 66 thereon, which are engaged by the threads of opening 44, which is formed by split plate members 42 and 43 when they are in their locked position. The connecting member 64 is provided with a hexagonal head 68. A sleeve member 67 is attached to the underside of cover 45 to support the fastening apparatus 41.

FIG. 3 also illustrates, in phantom lines, the position of split plate members 42 and 43 when they are in their unlocked or release position. As shown, plate member 42 moves outwardy and pivots about securing bolt 47'. Plate member 43 simultaneously moves outwardly and pivots about securing bolt 47. When split plate members 42 and 43 are in this position the connecting rod 26 is free to fall down and permit the lower hatch 25 to drop out thus clearing the chute 19 for passage therethrough.

In the operation of the split fastener 41, the handle 63 is grasped and pulled upwardly, thereby lifting the lower enlarged ends 62 of the pins 57 upwardly into openings 51 of bosses 49 and 54, allowing the lower ends 62 of pins 57 to clear the split plate members 42 and 43. The handle 63 is then turned a few degrees in a counterclockwise direction, as viewed from FIG. 2. By means of the pins 57 acting on the bosses 49 and 54 of plate members 42 and 43, respectively, these plate members will be caused to rotate slightly in a counterclockwise direction about bolts 47 and 47', respectively. The movement being permitted by the openings 58 in plate 56 and lugs 69, and being sufficient to free the threads 66 on connecting member 64 from engagement with the threads of openings 44 of plates 42 and 43.

In resetting the fastening apparatus to hold another connecting rod, a tighter connection and greater tension between the fastener and rod 26 can be obtained by engaging the hexagonal head 68 with a proper tool through the opening 61 in plate 56.

In the event of an emergency the operation of the release device 41 is relatively simple. The steps to be followed have been set forth above. It can thus be seen that applicants' device provides a quick releasing device which will permit the rapid releasing of the supported member in a situation that requires a minimum of time delay.

Obviously many modifications and variations of the present invention are possible in the light of the above teachings. It is therefore to be understood that within the scope of the appended claims the invention may be practiced otherwise than as specifically described.

What is claimed is:

1. A quick release fastening apparatus for release of an escape chute door comprising an outer door mounted in the outer end of the chute, a connecting rod secured to said door, a supporting means mounted in the inner end of the chute and having an opening therethrough, the other end of said connecting rod being screw threaded and passing through said opening, a pair of fastening plates Z-shaped in cross-section pivotally mounted at diametrically opposed points on said supporting means, said fastening plates having corresponding mating faces with a screw threaded semi-circular groove formed in each of said faces, said screw threaded grooves forming an opening which engages and threadedly secures the screw threaded end of said connecting rod, an elongated boss having a slot therein positioned on one end of each of said Z-shaped plates opposite the end of the plates that are pivotally mounted to said support means, openings in the plates and the support means that are in alignment with each other and the slots in said bosses, an elongated pin extending through each of said slots in the bosses and aligned openings in the plates and supporting means, handle means connected to said pins whereby pulling of the handle upwardly, the pins pass upwardly and out of the aligned opening in the plates and supporting means and are positioned within the slot in the bosses, and a turning of the handle will thereby release the fastening plates from each other to allow the plates to pivotally separate from their mating position to release said connecting rod.

2. The combination set forth in claim 1 wherein said handle means comprises a plate having a central opening therein and rigidly secured to said pins, a handle secured to said plate, the upper end of said screw threaded connecting rod having a hexagonal head thereon, whereby a tightening tool can pass downwardly through the central opening in said plate and engage said hexagonal head to tighten the connection between the fastening plates and the rod when the plates are in their mating position.

References Cited in the file of this patent

UNITED STATES PATENTS

| | | |
|---|---|---|
| 2,780,264 | Aspey | Feb. 5, 1957 |
| 2,904,366 | Miller et al. | Sept. 15, 1959 |